(12) United States Patent
Lifshitz

(10) Patent No.: US 8,787,471 B1
(45) Date of Patent: Jul. 22, 2014

(54) ALIGNMENT OF DIGRF4 LANE

(75) Inventor: Elad Lifshitz, Shaarei Tikva (IL)

(73) Assignee: Marvell International Ltd., Hamilton (BM)

( * ) Notice: Subject to any disclaimer, the term of this patent is extended or adjusted under 35 U.S.C. 154(b) by 129 days.

(21) Appl. No.: 13/371,438

(22) Filed: Feb. 12, 2012

Related U.S. Application Data

(60) Provisional application No. 61/443,198, filed on Feb. 15, 2011.

(51) Int. Cl.
*H04K 1/10* (2006.01)

(52) U.S. Cl.
USPC ........................................................ 375/260

(58) Field of Classification Search
USPC ........................................................ 375/260
See application file for complete search history.

(56) References Cited

U.S. PATENT DOCUMENTS

| | | | |
|---|---|---|---|
| 6,198,755 B1 * | 3/2001 | Berry | 370/537 |
| 6,741,615 B1 * | 5/2004 | Patwardhan et al. | 370/514 |
| 6,876,630 B1 * | 4/2005 | Shim | 370/242 |
| 7,600,162 B2 * | 10/2009 | Nishizawa | 714/700 |
| 8,059,684 B2 * | 11/2011 | Xiao et al. | 370/474 |
| 8,406,702 B2 | 3/2013 | Crowley et al. | |
| 8,437,725 B2 | 5/2013 | Brunel et al. | |
| 8,473,000 B2 | 6/2013 | Kelleher et al. | |
| 2003/0079118 A1 * | 4/2003 | Chow | 712/300 |
| 2007/0033493 A1 * | 2/2007 | Flake | 714/770 |
| 2007/0217378 A1 * | 9/2007 | Moorti et al. | 370/338 |
| 2007/0232244 A1 * | 10/2007 | Mo et al. | 455/91 |
| 2007/0254599 A1 | 11/2007 | O'Keeffe et al. | |
| 2007/0273709 A1 * | 11/2007 | Kimura et al. | 345/619 |
| 2008/0267332 A1 | 10/2008 | Garg et al. | |
| 2009/0022177 A1 | 1/2009 | Schuster et al. | |
| 2009/0086870 A1 * | 4/2009 | Mohiuddin | 375/371 |
| 2009/0238103 A1 | 9/2009 | Yamazaki | |
| 2009/0245334 A1 * | 10/2009 | Chaudhuri et al. | 375/222 |
| 2009/0252075 A1 * | 10/2009 | Ji et al. | 370/312 |
| 2010/0118999 A1 * | 5/2010 | Inagawa | 375/260 |
| 2010/0265953 A1 * | 10/2010 | Xiao et al. | 370/394 |
| 2011/0012663 A1 | 1/2011 | Crowley et al. | |
| 2011/0075762 A1 * | 3/2011 | Jeon | 375/296 |
| 2011/0167185 A1 | 7/2011 | O'Brien et al. | |
| 2012/0033720 A1 | 2/2012 | Brunel et al. | |
| 2012/0177163 A1 | 7/2012 | Meltzer et al. | |

OTHER PUBLICATIONS

MIPI Alliance, Inc., "Draft MIPI Alliance Specification for DigRF v4," draft version 1.00.00, revision 0.03, Dec. 15, 2009.
MIPI Alliance, Inc., "Draft MIPI Alliance Specification for Dual Mode 2.5G/3G Baseband/RFIC Interface," draft version 3.09.05, Revision 0.02—Dec. 7, 2009.
MIPI Alliance, Inc., "Draft MIPI Alliance Specification for DigRF v4," draft version 1.00.00, revision 0.01, Nov. 20, 2009.
MIPI Alliance, Inc., "Draft MIPI Alliance Specification for MPHY," draft version 0.80.00, revision 0.04, Apr. 12, 2010.
U.S. Appl. No. 13/342,992 office action dated Aug. 22, 2013.

\* cited by examiner

*Primary Examiner* — Santiago Garcia

(57) ABSTRACT

A method includes receiving, over multiple serial interfaces arranged in parallel to couple between a transmitter and a receiver, a data burst which includes start-of-frame markers and is transmitted over the serial interfaces as multiple respective partial bursts such that each start-of-frame marker is transmitted over the multiple serial interfaces. A relative symbol offset between two or more start-of-frame markers on respective two or more of the serial interfaces is detected at the receiver. The data burst is decoded based on the detected relative symbol offset.

16 Claims, 3 Drawing Sheets

| s1\s0 | 1 | 2 | 3 | 4 | 5 | 6 | 7 | 8 | 9 | 0 |
|---|---|---|---|---|---|---|---|---|---|---|
| 0 | 0 | 0 | 0 | 0 | | 1 | 1 | 1 | 1 | 1 |
| 1 | 1 | 1 | 1 | 1 | 1 | | 2 | 2 | 2 | 2 |
| 2 | 1 | 1 | 1 | 1 | 1 | | 2 | 2 | 2 | |
| 3 | 1 | 1 | 1 | 1 | 1 | 1 | 1 | | 2 | 2 |
| 4 | 1 | 1 | 1 | 1 | 1 | 1 | 1 | | | 2 |
| 5 | 1 | 1 | 1 | 1 | 1 | 1 | 1 | 1 | 1 | |
| 6 | | 1 | 1 | 1 | 1 | 1 | 1 | 1 | 1 | 1 |
| 7 | 0 | | 1 | 1 | 1 | 1 | 1 | 1 | 1 | 1 |
| 8 | 0 | 0 | | 1 | 1 | 1 | 1 | 1 | 1 | 1 |
| 9 | 0 | 0 | 0 | | 1 | 1 | 1 | 1 | 1 | 1 |
FIG. 5
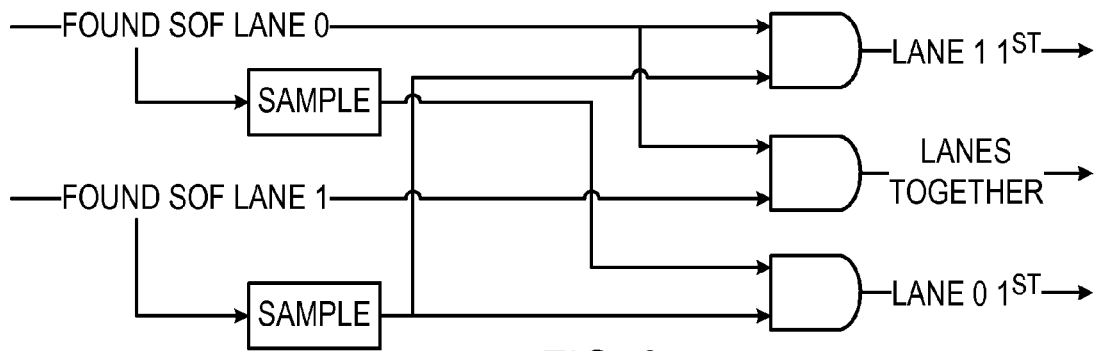
FIG. 6
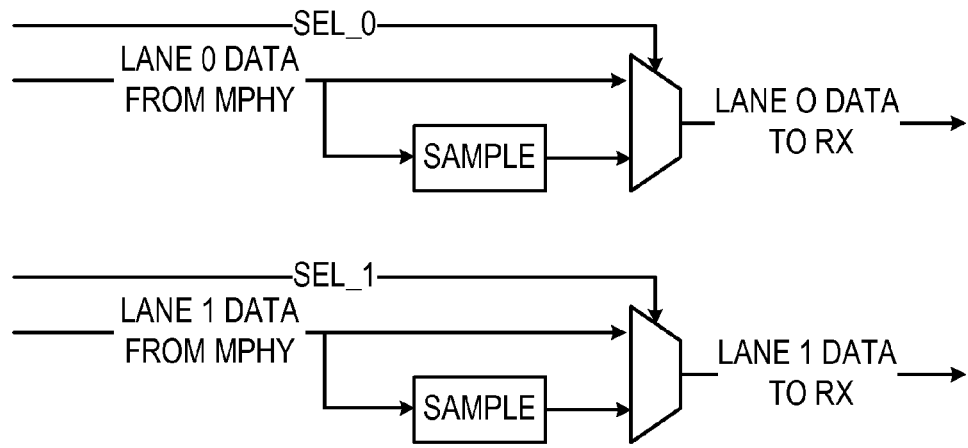
FIG. 7

ALIGNMENT OF DIGRF4 LANE

CROSS-REFERENCE TO RELATED APPLICATIONS

This application claims the benefit of U.S. Provisional Patent Application 61/443,198, filed Feb. 15, 2011, whose disclosure is incorporated herein by reference.

FIELD OF THE DISCLOSURE

The present invention relates generally to communication systems, and particularly to interfaces between baseband and Radio Frequency (RF) devices in communication equipment.

BACKGROUND

Some communication devices, such as wireless communication terminals and base stations, comprise a Baseband Integrated Circuit (BBIC) and a Radio Frequency Integrated Circuit (RFIC) that are connected by a digital interface. For example, the Mobile Industry Processor Interface (MIPI) Alliance has developed a set of such interface specifications called DigRF.

A variant of the DigRF interface, referred to herein for the sake of brevity as DigRF4, is specified in "MIPI Alliance Specification for DigRF v4," draft version 1.00.00, revision 0.01, Nov. 20, 2009, which is incorporated herein by reference. The physical layer used in DigRF4, referred to as MPHY, is specified in "MIPI Alliance Specification for MPHY," draft version 0.80.00, revision 0.04, Apr. 12, 2010, which is incorporated herein by reference.

The description above is presented as a general overview of related art in this field and should not be construed as an admission that any of the information it contains constitutes prior art against the present patent application.

SUMMARY

An embodiment that is described herein provides a method including receiving, over multiple serial interfaces arranged in parallel to couple between a transmitter and a receiver, a data burst which includes start-of-frame markers and is transmitted over the serial interfaces as multiple respective partial bursts such that each start-of-frame marker is transmitted over the multiple serial interfaces. A relative symbol offset between two or more start-of-frame markers on respective two or more of the serial interfaces is detected at the receiver. The data burst is decoded based on the detected relative symbol offset.

In some embodiments, detecting the relative symbol offset includes correcting a synchronization error between the serial interfaces. In an embodiment, decoding the data burst includes identifying, based on the relative symbol offset, a serial interface that carries a header of a data frame transmitted in the data burst. In a disclosed embodiment, identifying the serial interface includes determining the serial interface upon detecting a failure to receive a portion of the data burst, and decoding the data burst includes re-establishing reception of the data burst subsequently to the portion by decoding the header on the determined serial interface.

In another embodiment, the method includes defining one of the serial interfaces as a primary interface and another of the serial interfaces as a secondary interface, and identifying the serial interface that carries the header includes: when the relative symbol offset between the start-of-frame markers in the primary interface and the secondary interface is zero, detecting that the primary interface carries the header; when a start-of-frame marker in the primary interface appears ahead of the start-of-frame marker in the secondary interface, detecting that the secondary interface carries the header; and when the start-of-frame marker in the secondary interface appears ahead of the start-of-frame marker in the primary interface, detecting that the primary interface carries the header.

In some embodiments, receiving the partial bursts including accepting the partial bursts over respective lanes of a DigRF interface. In an embodiment, each of the partial bursts includes a respective sequence of symbols each divided into Unit Intervals (UIs), and decoding the data burst includes reconstructing the data burst subject to accepting the partial bursts with a mutual timing offset that does not exceed four UIs.

In some embodiments, detecting the relative symbol offset between the start-of-frame markers includes correcting the relative symbol offset in the received partial bursts so as to match the relative symbol offset that is set when the data burst is transmitted over the serial interfaces. In an embodiment, correcting the relative symbol offset includes compensating for a time delay between the serial interfaces. Additionally or alternatively, correcting the relative symbol offset includes compensating for timing skew between respective clock signals that clock the serial interfaces. Further additionally or alternatively, correcting the relative symbol offset includes applying a symbol delay to one of the received partial bursts.

There is additionally provided, in accordance with an embodiment that is described herein, apparatus including an input circuit and an alignment circuit. The input circuit is configured to receive, over multiple serial interfaces arranged in parallel, a data burst which includes start-of-frame markers and is transmitted over the serial interfaces as multiple respective partial bursts such that each start-of-frame marker is transmitted over the multiple serial interfaces. The alignment circuit is configured to detect a relative symbol offset between two or more start-of-frame markers on respective two or more of the serial interfaces, and to decode the data burst based on the detected relative symbol offset.

In some embodiments, a mobile communication terminal includes the disclosed apparatus. In some embodiments, chipset for processing signals in a mobile communication terminal includes the disclosed apparatus.

The present disclosure will be more fully understood from the following detailed description of the embodiments thereof, taken together with the drawings in which:

BRIEF DESCRIPTION OF THE DRAWINGS

FIG. 5 is a table showing symbol timing corrections to be applied between DigRF4 lanes, in accordance with an embodiment that is described herein;

FIG. 6 is a block diagram that schematically illustrates a circuit for identifying clock offset between DigRF4 lanes, in accordance with an embodiment that is described herein; and FIG. 7 is a block diagram that schematically illustrates a circuit for aligning DigRF4 lanes, in accordance with an embodiment that is described herein.

DETAILED DESCRIPTION OF EMBODIMENTS

In some types of digital interfaces, a data burst that carries data frames is sent as multiple partial bursts over multiple respective serial interfaces arranged in parallel, for example in order to increase throughput and reduce latency. The DigRF4 specification, for example, defines transmission of a data burst over multiple serial interfaces that are referred to as lanes.

A DigRF4 data burst comprises one or more data frames, each beginning with a start-of-frame marker followed by a header. When a DigRF4 data burst is sent over multiple lanes, the start-of-frame marker of each data frame is duplicated over the multiple lanes, but the header is sent over only one lane.

Generally, there is no guarantee as to which lane will be used for sending the header. Therefore, if decoding of a received data burst fails at some point along the burst, it may not be possible to identify the header of the next data frame and re-establish decoding. As a result, the portion of the data burst following the decoding failure may be lost.

Embodiments that are described herein provide improved methods and systems for receiving and decoding data bursts that are transmitted over multiple serial interfaces in the above manner. In some disclosed embodiments, an alignment circuit detects a symbol offset between two or more of the start-of-frame markers that are transmitted over two or more of the serial interfaces. The alignment circuit identifies the serial interface that carries the header of the next data frame based on the detected symbol offset. Such an identification is possible because the number of possible symbol offsets is finite and small, and each symbol offset is uniquely indicative of the lane that carries the header of the next data frame. Using this identification, it is possible to decode the header of the next data frame and re-establish successful decoding of the data burst.

Example techniques for detecting the symbol offset between start-of-frame markers and identifying the header are described herein. Other disclosed techniques correct sub-symbol timing offsets between the received partial bursts, which may cause the alignment circuit to err in measuring the symbol offset. Such techniques are able to compensate for timing offsets caused by time delay differences in circuitry and/or circuit traces, as well as for timing skew between clock signals that clock the serial interfaces.

The disclosed techniques enable rapid re-establishment of successful decoding of a data burst following decoding failure. As such, these techniques reduce the data loss caused by decoding failures, thereby increasing the interface reliability and/or reducing the need for data retransmission.

Figure 1:
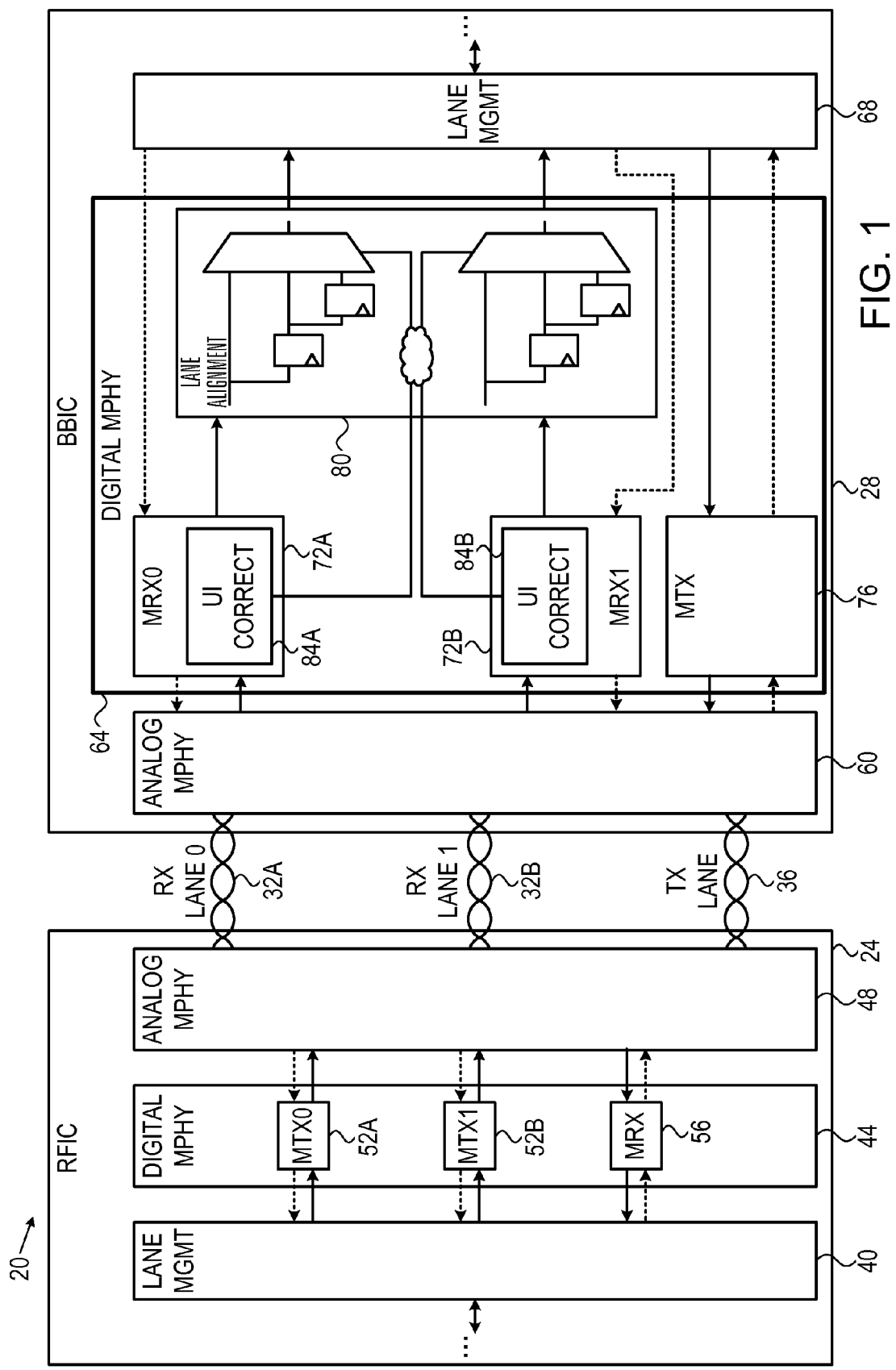
FIG. 1 is a block diagram that schematically illustrates a Radio Frequency Integrated Circuit (RFIC) and a Baseband Integrated Circuit (BBIC) connected by a DigRF4 interface, in accordance with an embodiment that is described herein.

FIG. 1 is a block diagram that schematically illustrates a communication device 20, which comprises a Radio Frequency Integrated Circuit (RFIC) 24 and a Baseband Integrated Circuit (BBIC) 28 that are connected by a DigRF4 interface, in accordance with an embodiment that is described herein.

In the embodiments described herein, the RFIC and BBIC are used in a mobile communication terminal that operates in a cellular communication network such as a Global System for Mobile Communications (GSM) network, Wideband Code Division Multiple Access (WCDMA) network, Long-Term Evolution (LTE) network or other suitable cellular communication network. Alternatively, however, the RFIC and BBIC can be used in any other suitable communication device, such as a cellular base station.

In the example of FIG. 1, the DigRF4 interface between RFIC 24 and BBIC 28 uses a total of three serial interfaces referred to as lanes. Two receive lanes 32A and 32B (denoted RX lane 0 and RX lane 1, respectively), are used for transferring data from RFIC 24 to BBIC 28. In the opposite direction, i.e., for transferring data from BBIC 28 to RFIC 24, the DigRF4 interface uses a single transmit lane 36.

The numbers of lanes used in the example of FIG. 1 are chosen solely by way of example. In alternative embodiments, the RFIC and BBIC can be connected using any suitable number of receive lanes and any suitable number of transmit lanes. Moreover, the disclosed techniques are not limited to DigRF4 interfaces, and can be used with any other suitable digital interface that enables communication over multiple parallel lanes.

FIG. 1 focuses on aspects, e.g., functionality and couplings that support such functionality, of the interfaces between the RFIC and BBIC. Other RFIC and BBIC elements have been omitted from the figure in order not to obfuscate teaching the principles of the disclosed techniques. Generally, solid arrows in the figure indicate data signals and dashed arrows indicate control signal. These directions, however, are in no way exclusive—any other suitable data and control signals may be defined.

RFIC 24 comprises a lane management unit 40, which manages the transmission and reception over the various DifRF4 lanes, in an embodiment. The physical layer functions of the DigRF4 interface in the RFIC are carried out by a digital MPHY unit 44 and an analog MPHY unit 48. Digital MPHY unit 44 comprises respective MPHY transmission modules 52A and 52B denoted MTX0 and MTX1, for transmitting messages to BBIC 28 over RX lanes 32A and 32B. Unit 44 further comprises an MPHY reception module 56 denoted MRX for receiving messages from the BBIC over TX lane 36.

BBIC 28 comprises an analog MPHY unit 60 and a digital MPHY unit 64, which carry out the physical layer functions of the DigRF4 interface in the RFIC, in an embodiment. A lane management unit 68 manages the transmission and reception over the DigRF4 lanes. Digital MPHY unit 64 comprises respective MPHY reception modules 72A and 72B denoted MRX0 and MRX1, for receiving messages from RFIC 24 over RX lanes 32A and 32B. Unit 64 further comprises an MPHY transmission module 76 denoted MTX for transmitting messages to the RFIC over TX lane 36.

In some embodiments, digital MPHY unit 64 in BBIC 28 comprises a lane alignment module 80, which aligns the timing of DigRF4 Symbol Intervals (SIs) between RX lane 0 and RX lane 1. Modules 72A and 72B comprise Unit Interval (UI) correction modules 84A and 84B, respectively, which perform finer timing corrections at the level of DigRF4 UIs. The operation of modules 80, 84A and 84B are described in detail further below.

The configurations of device 20 and of RFIC 24 and BBIC 28 shown in FIG. 1 are example configurations, which are depicted solely for the sake of clarity. In alternative embodiments, any other suitable communication device, RFIC and BBIC configurations can be used. For example, the disclosed techniques can be implemented in the RFIC in order to align multiple TX lanes.

Device, RFIC and BBIC elements that are not mandatory for understanding of the disclosed techniques have been omitted from the figure for the sake of clarity. In some embodiments, device 20, which comprises RFIC 24 and BBIC 28, comprises a mobile communication terminal. In some embodiments, RFIC 24 and BBIC 28 are implemented as one or more signal processing chipsets for mobile communication terminals.

In the present context, analog MPHY unit 60 is regarded as an input circuit that receives the multiple symbol sequences over the multiple RX lanes. Digital MPHY unit 64 is regarded as an alignment circuit that carries out the disclosed alignment techniques. In alternative embodiments, the input circuit and alignment circuit may be implemented in any other suitable configuration.

In various embodiments, some or all of the elements of device 20 are implemented in hardware, such as implementing the BBIC using one or more Field-Programmable Gate Arrays (FPGAs) or Application-Specific Integrated Circuits (ASICs). In alternative embodiments, certain elements of device 20, e.g., certain functions of the BBIC, are implemented in software, or using a combination of hardware and software elements. In some embodiments, certain elements of device 20, such as certain elements of BBIC 28, are implemented in a programmable processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

In accordance with the DigRF4 specifications, RFIC 24 sends messages to BBIC 28 by transmitting data bursts, each data burst comprising a sequence of symbols. Each symbol comprises a series of ten bits: Each symbol is transmitted in a respective Symbol Interval (SI) that is divided into ten Unit Intervals (UIs), such that each UI carries a respective bit.

Each data burst comprises one or more data frames. Each data frame begins with a Start-of-Frame (SOF) marker followed by a header symbol, then one or more data symbols, and ends with an End-of-Frame (EOF) marker. One exception is the last data frame in the data burst, which ends with an End-of-Transmission (EOT) marker instead of an EOF marker. Data frames may be nested in one another. When transmitting a data burst over multiple lanes (in the present example RX lanes 32A and 32B), the transmitting lane management unit (unit 40 in the present example) inverse-multiplexes the symbols of the data burst over the multiple lanes, as demonstrated below.

Figure 2:
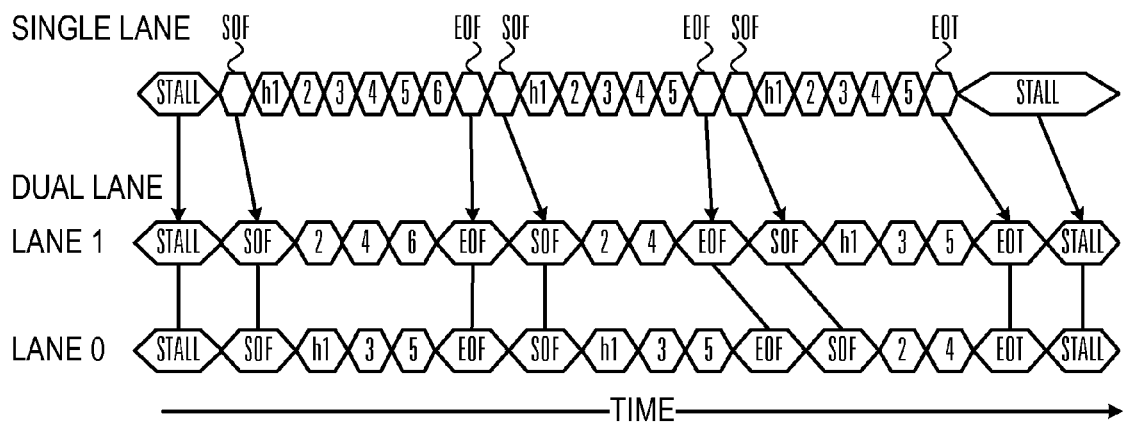
FIG. 2 is a diagram that schematically illustrates a process of transmitting a data burst over two DigRF4 lanes, in accordance with an embodiment that is described herein.

FIG. 2 is a diagram that schematically illustrates the process of transmitting a data burst over two DigRF4 lanes, in accordance with an embodiment that is described herein. The data burst is shown at the top of the figure. In this example, the data burst comprises three data frames. The header symbol of each data frame is denoted h1, and the subsequent data symbols are numbered sequentially. Before and after the burst, the DigRF4 interface is in a STALL state indicating no transmission.

The two signal waveforms at the bottom of the figure (denoted LANE 1 and LANE 2) show the data burst after is has been inverse-multiplexed by lane management unit 40 over RX lanes 32A and 32B, respectively. As seen in the figure, the SOF, EOF and EOT markers are duplicated and sent over both lanes. Following the duplicated SOF marker, the header (h1) and the subsequent data symbols are sent alternately on the two lanes. Lane 0 in this example is defined as a primary lane (by definition the lane over which the header of the first data frame in the data burst is sent) and lane 1 is defined as a secondary lane.

In practice, BBIC 28 may sometimes fail to decode a portion of the data burst, for example because of noise on the RX lanes or for any other reason. When decoding fails at some point along the data burst, there is no guarantee as to which lane will carry the header (h1) of the next data frame. As seen in the example of FIG. 1, the headers of the first and second data frames are sent over lane 0, but the header of the third data frame is sent over lane 1. This uncertainty may prevent the BBIC from identifying the header of the next data frame, and may therefore cause the BBIC to lose the rest of the data burst.

Figure 3A:
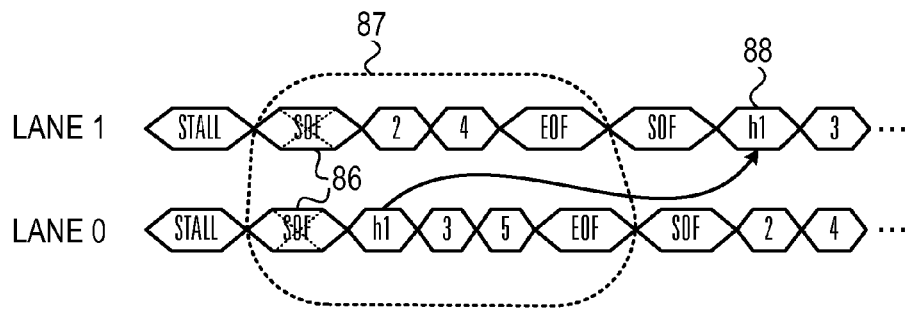
FIGS. 3A and 3B are diagrams that schematically illustrate possible positions of Start-of-Frame (SOF) markers in a data burst transmitted over two DigRF4 lanes, in accordance with an embodiment that is described herein.
Figure 3B:
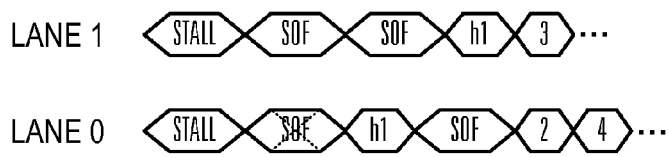

FIGS. 3A and 3B are diagrams that schematically illustrate possible positions of SOF markers in a data burst transmitted over two DigRF4 lanes, in accordance with an embodiment that is described herein. These figures demonstrate why it is not generally known, after decoding failure during a data burst, which lane will carry the header of the next data frame. In FIG. 3A, the BBIC failed to decode a first pair of SOF markers 86 in the burst (one in lane 0 and the other in lane 1), and therefore missed the first data frame (denoted 87 in the figure). In this example, the first data frame has an odd number of symbols, and therefore a header 88 of the second data frame is sent over lane 1. FIG. 3B shows a case of nested data frames, in which the BBIC missed the SOF marker on lane 0. In this case, the header of one data frame is sent on lane 0 and the header of the other data frame is sent over lane 1.

In some embodiments, upon a failure to decode a portion of a data burst, lane management unit 68 in BBIC 28 identifies the lane over which the header of the next data frame in the burst will be sent. Unit 68 identifies the lane based on the relative offset, in Symbol Intervals (SIs), between the SOF markers received on RX lanes 32A and 32B. Each relative symbol position of SOF markers is mapped to a selected lane (the primary lane or the secondary lane) over which the header of the next data frame is sent.

In these embodiments, lane management unit 68 detects the SOF markers on lanes 32A and 32B, identifies the relative symbol offset between them, and determines the lane on which the header is transmitted. The lane management unit then decodes the header on the determined lane, and is thus able to decode the remainder of the data burst successfully. As will be described below, in some embodiments the lane management unit detects and corrects a synchronization error between the lanes so that the relative symbol offset detected in the BBIC will match the relative symbol offset set in the RFIC.

In some embodiments, unit 68 distinguishes between three possible relative positions of the SOF markers, and the corresponding location of the subsequent header (h1):

| Case I: | | | |
|---|---|---|---|
| Primary lane: | <SOF> | <h1> | ... |
| Secondary lane: | <SOF> | ... | ... |
| Case II: | | | |
| Primary lane: | ... | <SOF> | ... |
| Secondary lane: | <SOF> | <h1> | ... |
| Case III: | | | |
| Primary lane: | <SOF> | <h1> | ... |
| Secondary lane: | | <SOF> | ... |

The mapping applied by unit 68 is thus given in the following table:

TABLE 1

Mapping of SOF symbol offset to lane carrying the next header

| Case | Relative symbol offset between SOF markers on primary and secondary lanes: | Lane carrying the header of the next data frame: |
|---|---|---|
| I | 0 | Primary |
| II | 1 (SOF in primary precedes SOF in secondary by one symbol.) | Secondary |
| III | −1 (SOF in secondary precedes SOF in primary by one symbol.) | Primary |

The example above refers to the case of transmission of a data burst over two lanes. The disclosed technique, however, can be generalized in a straightforward manner to any desired number of lanes, e.g., three or four lanes.

In some practical implementations, digital MPHY 64 in BBIC 28 introduces an erroneous timing offset between the received symbol sequences of lanes 32A and 32B. This mismatch may be caused, for example, by time delay differences between the circuitry or Printed Circuit Board (PCB) traces of lanes 32A and 32B, by time delays between the clock signals that clock lanes 32A and 32B, or for any other reason. This sort of mismatch, unless corrected, may cause lane management unit 68 to misinterpret the relative symbol offset between the SOF markers of the two lanes. Referring to the example of Table 1 above, the mismatch may cause unit 68 to select the wrong case among cases I-III. As a result, unit 68 may fail in detecting the header of the next data frame.

In some embodiments, lane alignment module 80 in BBIC 28 identifies and corrects the timing mismatch between lanes 32A and 32B. The correction is applied such that the symbol sequences provided to lane management unit 68 (the symbol sequences at the output of module 80) in the BBIC have the same relative Symbol Interval (SI) offset as the symbol sequences produced by lane management unit 40 in the RFIC. By operating on the aligned symbol sequences, unit 68 is able to identify the correct relative symbol offset between the SOF markers of the two lanes, and thus detect the header of the next data frame correctly.

Figure 4:
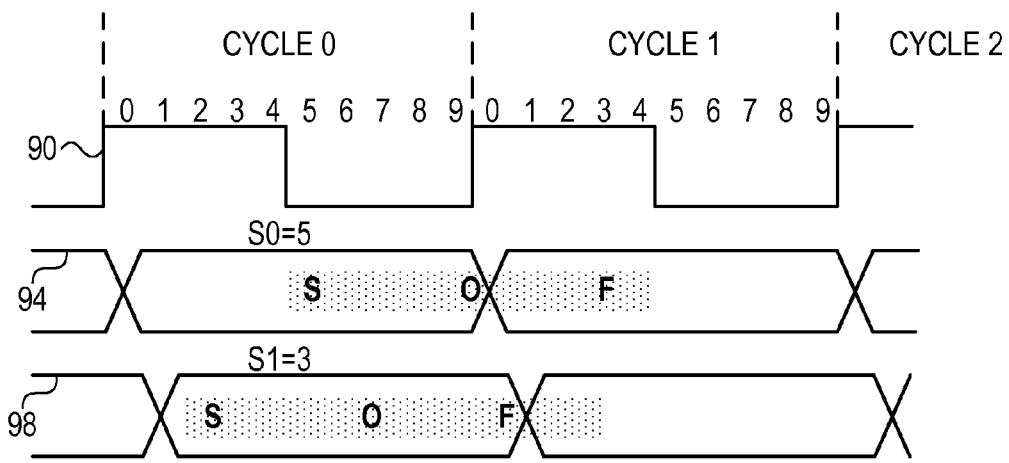
FIG. 4 is a diagram that schematically illustrates a timing offset between DigRF4 lanes, in accordance with an embodiment that is described herein.

FIG. 4 is a diagram that schematically illustrates an example timing offset between DigRF4 lane 0 (corresponding to a graph 94 in the figure) and lane 1 (corresponding to a graph 98), in accordance with an embodiment that is described herein. In this example, a graph 90 shows the clock signal used by lane management unit 68 for sampling the symbol sequences received over lanes 32A and 32B. Each clock cycle is one SI long, and is divided (as explained above) into ten UIs that are numbered 0 . . . 9. Sampling is performed at the clock signal's falling edge in the middle of each cycle.

Graphs 94 and 98 show the waveforms on lanes 32A (lane 0) and 32B (lane 1), respectively. Each graph also shows the timing at which the SOF markers appear on the two lanes. In this example, the timing offset between the two SOF markers is caused by two factors—differences in time delay between the two lanes, and timing skew between the clock signals of the two lanes. The resulting shift is five Unit Intervals (UIs—ten of which make-up each Symbol Interval—SI) for lane 0 and three UIs for lane 1. In this particular example, clock signal 90 would sample both SOF markers in the same SI, i.e., unit 80 would identify the correct offset of zero SI between them. For other timing mismatches between the symbol sequences, clock signal 90 may err in sampling the two SOF markers and unit 80 may therefore identify an incorrect SI offset between them.

In some embodiments, unit 80 inserts a delay of one SI into one of the two lanes. This delay causes the subsequent sampling of the symbol sequences to produce the correct SI offset between the lanes, as shown in FIG. 5 below.

FIG. 5 is a table showing symbol timing corrections to be applied between DigRF4 lanes 32A and 32B, in accordance with an embodiment that is described herein. The table of FIG. 5 indicates the lane in which a delay of one SI is to be inserted, for each possible combination of UI shifts in lane 0 and lane 1. The assumption here is that the relative UI shift between the lanes does not exceed four UIs. The UI shift in lane 0 is denoted s0, the UI shift in lane 1 is denoted s1, and FIG. 5 indicates where to insert the SI delay in accordance with the following convention:

TABLE 2

Dummy delay insertion rule

| Table value in FIG. 5 | Lane in which to insert one SI delay |
|---|---|
| "0" | Lane 1 |
| "1" | Lane 0 |
| "2" | None |

In some embodiments, UI correction modules 84A and 84B measure the UI shifts in their respective received symbol sequences, and report the measured UI shifts to lane alignment unit 80. Unit 80 uses the reported UI shifts to insert the SI delay as applicable, according to the table in FIG. 5.

In some embodiments, lane alignment unit 80 implements the above-described mechanism using a combination of two criteria—(i) the relation between s0 and s1 according to FIG. 5, and (ii) the lane in which the SOF marker was identified first. In an example embodiment, unit 80 controls the insertion of the SI delay using two selection signals denoted sel 0 and sel 1, according to the following table:

TABLE 3

SI delay insertion scheme

| Criteria | Selection signal values | SI delay insertion |
|---|---|---|
| (state is not BURST) | sel_0 = 0 sel_1 = 0, | No insertion |
| (SOF detected first in lane 1) and (((s1 = 0) and (0 < s0 < 5)) or ((s1 > s0 + 5) and (0 < s0 < 5))) | sel_0 = 0, sel_1 = 1 | Insert one SI delay in lane 1 |
| (SOF detected first in lane 0) and (((s0 = 0) and (0 < s1 < 5)) or ((0 < s1 < s0-5) and (s0 > 6))) | sel_0 = 1, sel_1 = 0 | Insert one SI delay in lane 0 |
| SOF detected together in lane 0 and lane 1 | sel_0 = 0, sel_1 = 0 | No insertion |

FIG. 6 is a block diagram that schematically illustrates a circuit for identifying clock offset between DigRF4 lanes, in accordance with an embodiment that is described herein.

The circuit of FIG. 6, which is implemented in some embodiments as part of unit 80, accepts as input two signals, one indicating SOF marker detection in lane 32A (lane 0) and the other indicating SOF marker detection in lane 32B (lane 1).

Using a pair of sample registers and three AND gates, the circuit of FIG. 6 outputs three signals: One output signal is set when an SOF marker is detected in lane 0 before lane 1, a second output signal is set when an SOF marker is detected in lane 1 before lane 0, and a third output signal is set when an SOF marker is detected concurrently in both lanes. In an embodiment, the three output signals of the circuit are used for assessing the criteria of Table 3 above.

FIG. 7 is a block diagram that schematically illustrates a circuit for aligning DigRF4 lanes, in accordance with an embodiment that is described herein. In an embodiment, the circuit of FIG. 7 is implemented as part of unit 80. The circuit of FIG. 7 conditionally inserts one SI delay into lane 0 and/or lane 1 based on the sel 0 and sel 1 selection signals, as explained above with regard to Table 3.

The circuit accepts as input the received symbol sequences of lane 0 and lane 1 from modules 72A and 72B, and the selection signals sel 0 and sel 1. Using two sample registers and corresponding multiplexers, the circuit conditionally inserts one SI delay into lane 0 and/or lane 1. The insertion is performed in accordance with Table 3 above.

Although the embodiments described herein mainly address DigRF4 applications, the methods and systems described herein can also be used in other applications, such as in PCI express, USB 3, fast Ethernet transceivers and/or any other suitable systems that transmit data over two or more non-synchronized lanes.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
receiving, over multiple serial interfaces arranged in parallel to couple between a transmitter and a receiver, a data burst which comprises start-of-frame markers and is transmitted over the serial interfaces as multiple respective partial bursts such that each start-of-frame marker is transmitted over the multiple serial interfaces;
detecting at the receiver a relative symbol offset between two or more start-of-frame markers on respective two or more of the serial interfaces; and
upon detecting a failure to receive a portion of the data burst, decoding the data burst by identifying, based on the detected relative symbol offset, a serial interface that carries a header of a data frame transmitted in the data burst, and re-establishing reception of the data burst subsequently to the portion by decoding the header on the determined serial interface.

2. The method according to claim 1, wherein detecting the relative symbol offset comprises correcting a synchronization error between the serial interfaces.

3. A method, comprising:
receiving, over multiple serial interfaces arranged in parallel to couple between a transmitter and a receiver, a data burst which comprises start-of-frame markers and is transmitted over the serial interfaces as multiple respective partial bursts such that each start-of-frame marker is transmitted over the multiple serial interfaces;
detecting at the receiver a relative symbol offset between two or more start-of-frame markers on respective two or more of the serial interfaces;
decoding the data burst by identifying, based on the detected relative symbol offset, a serial interface that carries a header of a data frame transmitted in the data burst; and
defining one of the serial interfaces as a primary interface and another of the serial interfaces as a secondary interface, wherein identifying the serial interface that carries the header comprises:
when the relative symbol offset between the start-of-frame markers in the primary interface and the secondary interface is zero, detecting that the primary interface carries the header;
when a start-of-frame marker in the primary interface appears ahead of the start-of-frame marker in the secondary interface, detecting that the secondary interface carries the header; and
when the start-of-frame marker in the secondary interface appears ahead of the start-of-frame marker in the primary interface, detecting that the primary interface carries the header.

4. The method according to claim 1, wherein receiving the partial bursts comprises accepting the partial bursts over respective lanes of a DigRF interface.

5. The method according to claim 1, wherein each of the partial bursts comprises a respective sequence of symbols each divided into Unit Intervals (UIs), and wherein decoding the data burst comprises reconstructing the data burst subject to accepting the partial bursts with a mutual timing offset that does not exceed four UIs.

6. The method according to claim 1, wherein detecting the relative symbol offset between the start-of-frame markers comprises correcting the relative symbol offset in the received partial bursts so as to match the relative symbol offset that is set when the data burst is transmitted over the serial interfaces.

7. The method according to claim 6, wherein correcting the relative symbol offset comprises compensating for a time delay between the serial interfaces.

8. The method according to claim 6, wherein correcting the relative symbol offset comprises compensating for timing skew between respective clock signals that clock the serial interfaces.

9. The method according claim 6, wherein correcting the relative symbol offset comprises applying a symbol delay to one of the received partial bursts.

10. Apparatus, comprising:
an input circuit, which is configured to receive, over multiple serial interfaces arranged in parallel, a data burst which comprises start-of-frame markers and is transmitted over the serial interfaces as multiple respective partial bursts such that each start-of-frame marker is transmitted over the multiple serial interfaces; and
an alignment circuit, which is configured to detect a relative symbol offset between two or more start-of-frame markers on respective two or more of the serial interfaces, and, upon detecting a failure to receive a portion of the data burst, to decode the data burst by identifying, based on the detected relative symbol offset, a serial interface that carries a header of a data frame transmitted in the data burst, and re-establishing reception of the data burst subsequently to the portion by decoding the header on the determined serial interface.

11. The apparatus according to claim 10, wherein the alignment circuit is configured to correct a synchronization error between the serial interfaces.

12. Apparatus, comprising:
an input circuit, which is configured to receive, over multiple serial interfaces arranged in parallel, a data burst which comprises start-of-frame markers and is transmitted over the serial interfaces as multiple respective partial bursts such that each start-of-frame marker is transmitted over the multiple serial interfaces; and
an alignment circuit, which is configured to detect a relative symbol offset between two or more start-of-frame markers on respective two or more of the serial interfaces, to decode the data burst based on the detected relative symbol offset, to define one of the serial interfaces as a primary interface and another of the serial interfaces as a secondary interface, and to identify the serial interface that carries the header by:
when the relative symbol offset between the start-of-frame markers in the primary interface and the secondary interface is zero, detecting that the primary interface carries the header;
when a start-of-frame marker in the primary interface appears ahead of the start-of-frame marker in the secondary interface, detecting that the secondary interface carries the header; and
when the start-of-frame marker in the secondary interface appears ahead of the start-of-frame marker in the primary interface, detecting that the primary interface carries the header.

13. The apparatus according to claim 10, wherein the alignment circuit is configured to correct the relative symbol offset in the received partial bursts so as to match the relative symbol offset that is set when the data burst is transmitted over the serial interfaces.

14. The apparatus according to claim 13, wherein the alignment circuit is configured to correct the relative symbol offset by performing at least one action selected from among:
compensating for a time delay between the serial interfaces;
compensating for timing skew between respective clock signals that clock the serial interfaces; and
applying a symbol delay to one of the received partial bursts.

15. A mobile communication terminal comprising the apparatus of claim 10.

16. A chipset for processing signals in a mobile communication terminal, comprising the apparatus of claim 10.

* * * * *